United States Patent [19]

Farfaglia

[11] 3,837,467

[45] Sept. 24, 1974

[54] MEANS FOR POSITIONING ARTICLES ON A CONVEYOR

[75] Inventor: Silvio T. Farfaglia, Fulton, N.Y.

[73] Assignee: Phillips Petroleum Company, Bartlesville, Okla.

[22] Filed: Sept. 7, 1973

[21] Appl. No.: 395,034

[52] U.S. Cl............ 198/31 AC, 198/20 R, 198/31 R
[51] Int. Cl............................................. B65g 47/24
[58] Field of Search...... 198/20 R, 24, 29, 30, 31 R, 198/31 AC, 31 AB

[56] References Cited
UNITED STATES PATENTS 3,552,089   1/1971   Bushnell.......................... 198/31 AB
3,753,484   8/1973   Aivola et al...................... 198/20 R Primary Examiner—Richard A. Schacher
Assistant Examiner—Jeffrey V. Nase

[57] ABSTRACT

A transfer means moves an article between guide plates into an article holder at a transfer station on a conveyor. A positioning element is pivotably mounted adjacent the downstream guide plate to contact the article in the holder as the conveyor moves the holder and article away from the transfer station to properly position the article in the holder. The apparatus can be used to position rectangular cartons in rectangular article holders.

10 Claims, 6 Drawing Figures

MEANS FOR POSITIONING ARTICLES ON A CONVEYOR

The invention relates to means for positioning articles on a conveyor. In a specific aspect the invention relates to means for positioning rectangular cartons in rectangular holders on the intermittently actuated conveyor of a filling and sealing machine.

Accurate positioning of articles on a conveyor which takes the articles to one or more processing stations is frequently critical. Improper alignment of the articles can result in damage to the articles. This is particularly true for cartons which are being filled and sealed by automatic machinery.

Accordingly, it is an object of the invention to provide new and improved means for positioning articles on a conveyor. Another object of the invention is to eliminate damage to articles being conveyed through one or more processing operations. Another object is to avoid the loss of product in a packaging machine resulting from misalignment of the cartons. Other objects, aspects and advantages of the invention will be apparent from a study of the specification, the drawings and the appended claims to the invention.

Figure 1:
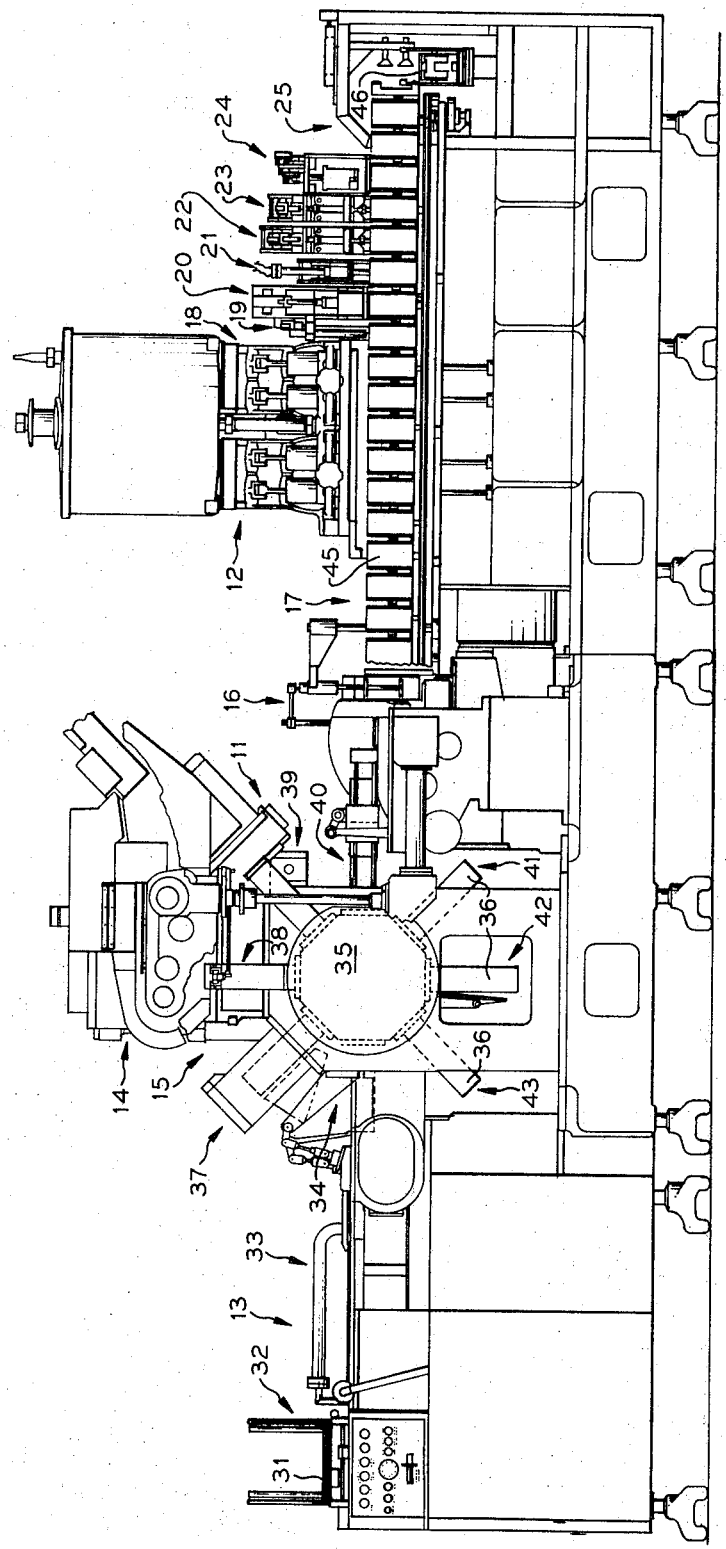
FIG. 1 is a front elevational view of a carton forming, filling and sealing machine embodying the present invention.

Referring now to the drawings in detail and to FIG. 1 in particular, the carton forming, filling and sealing machine comprises a forming section 11 and a filling and sealing section 12. The forming section 11 comprises a sidewall blank feeding and heating subsection 13, a bottom blank feeding and heating subsection 14, a forming subsection 15, and a transfer subsection 16. The filling and sealing section has two parallel endless conveyor systems 17, and each conveyor system comprises a filling subsection 18 occupying five conveyor stations, a defoaming station 19, a score breaking station 20, a top heating station 21, a folding and sealing station 22, a secondary sealing station 23, a branding station 24, and a transfer station 25.

The sidewall blanks 31 manually placed in the sidewall blank magazine 32 are flat, single sheets of paperboard, rectangular in shape, scored to provide five longitudinal panels, and a gable-top structure, and coated on both the top and bottom surfaces of each sheet with a thermoplastic material, e.g., polyethylene. The sidewall blanks 31 are successively withdrawn from magazine 32 and intermittently advanced through the sidewall blank heating station 33 to the sidewall blank receiving station 34 for turret 35. At the sidewall blank heating station 33, the side margins to be overlapped and the bottom margin of the sidewall blank are heated to a bonding temperature for the thermoplastic coating.

The turret 35 is journalled on a horizontal axis and carries eight circumferentially spaced apart mandrels 36 extending radially from the axis of turret 35. The cross section of each of mandrels 36 in a plane perpendicular to its longitudinal axis is generally rectangular. Suitable drive mechanism is provided for indexing or effecting intermittent rotation of the turret 35 to move each mandrel from the sidewall blank receiving station 34 through a blank folding station 37; a bottom end closure forming, applying and sealing station 38; a secondary bottom sealing station 39; a stripping station 40; and three successive nonoperating stations 41, 42 and 43.

Figure 2:
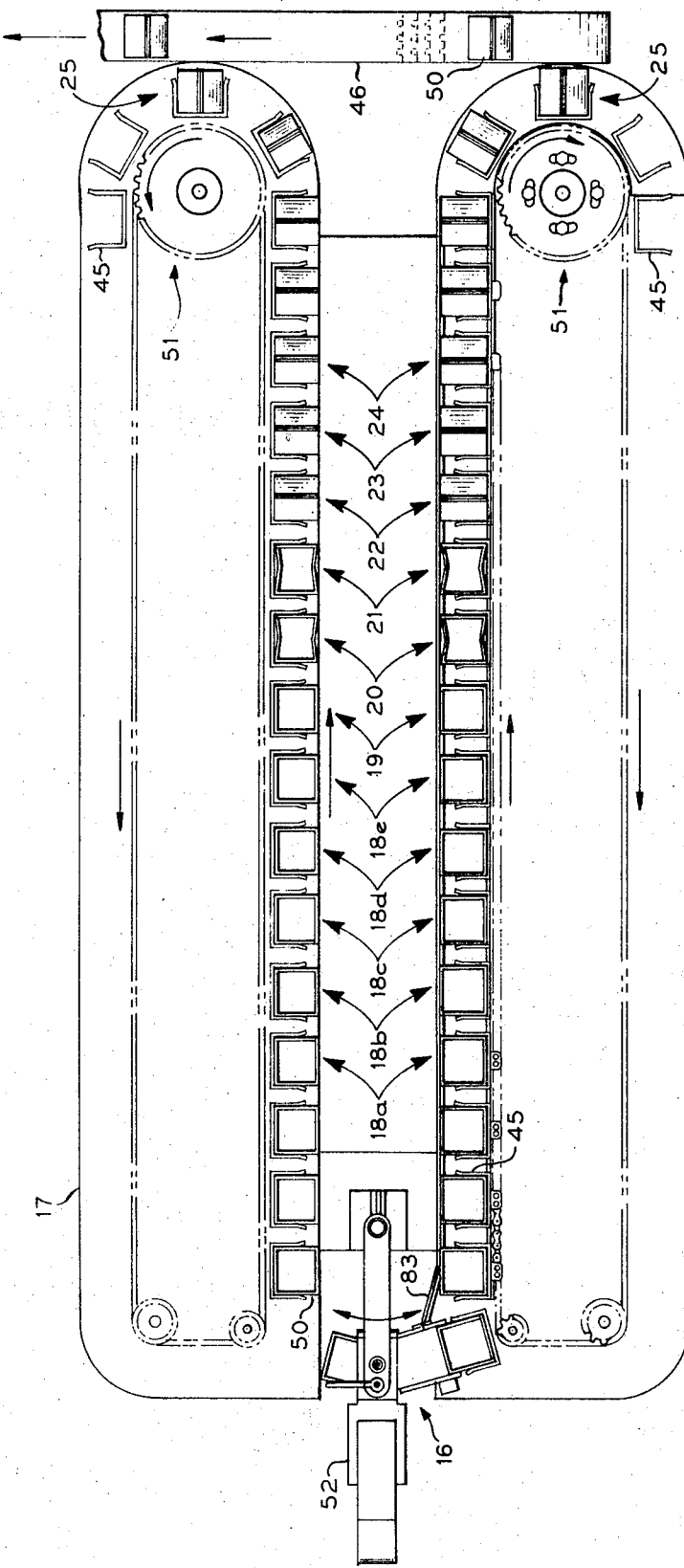
FIG. 2 is a simplified plan view showing the layout of the two endless conveyors of the filling and sealing section of the machine of FIG. 1.

Referring now to FIGS. 1 and 2, the tubular carton body having a bottom closure sealed thereto is removed from the mandrel 36 at the stripping station 40 and is transferred to a conveyor pocket 45 of one of the two horizontal conveyor systems 17. The product to be packaged is introduced into the open-topped tubular carton 50 in four equal amounts in the filling stations 18a, 18b, 18d and 18e of subsection 18. If desired, any foam resulting from the filling operation can be removed at defoaming station 19. The scores for the gable-top structure can be initially folded in the score breaking station 20, resulting in the conventional six-sided top structure. The gable-top ridge panels of the carton are heated in station 21 to a temperature at least as high as the thermal bonding temperature of the thermoplastic coatings on the carton. The heated superstructure is then folded into contact under pressure at the folding and sealing station 22 to effect the bonding of adjacent ridge panels. Secondary sealing station 23 applies pressure to the ridge panels during cooling of the thermoplastic bond. If desired, a date indicia, plant identification or other information can be applied to the bonded ridge panels of the sealed carton at branding station 24. The formed, filled and sealed carton is removed from its conveyor pocket 45 at the transfer station 25 and placed on a delivery conveyor 46.

Each conveyor system 17 is periodically driven by a ratchet drive 51 to move each conveyor pocket 45 from one station to the next adjacent station. Along the straight line portion of each conveyor run this distance is the distance from the centerline of one station to the centerline of the next station. The conveyor systems 17 maintain the conveyor pockets 45 stationary during the dwell period of each conveyor cycle to permit operations to be accomplished on the carton at each of the processing work stations 18a, 18b, 18d, 18e, 19, 20, 21, 22, 23, 24 and 25.

Figure 3:
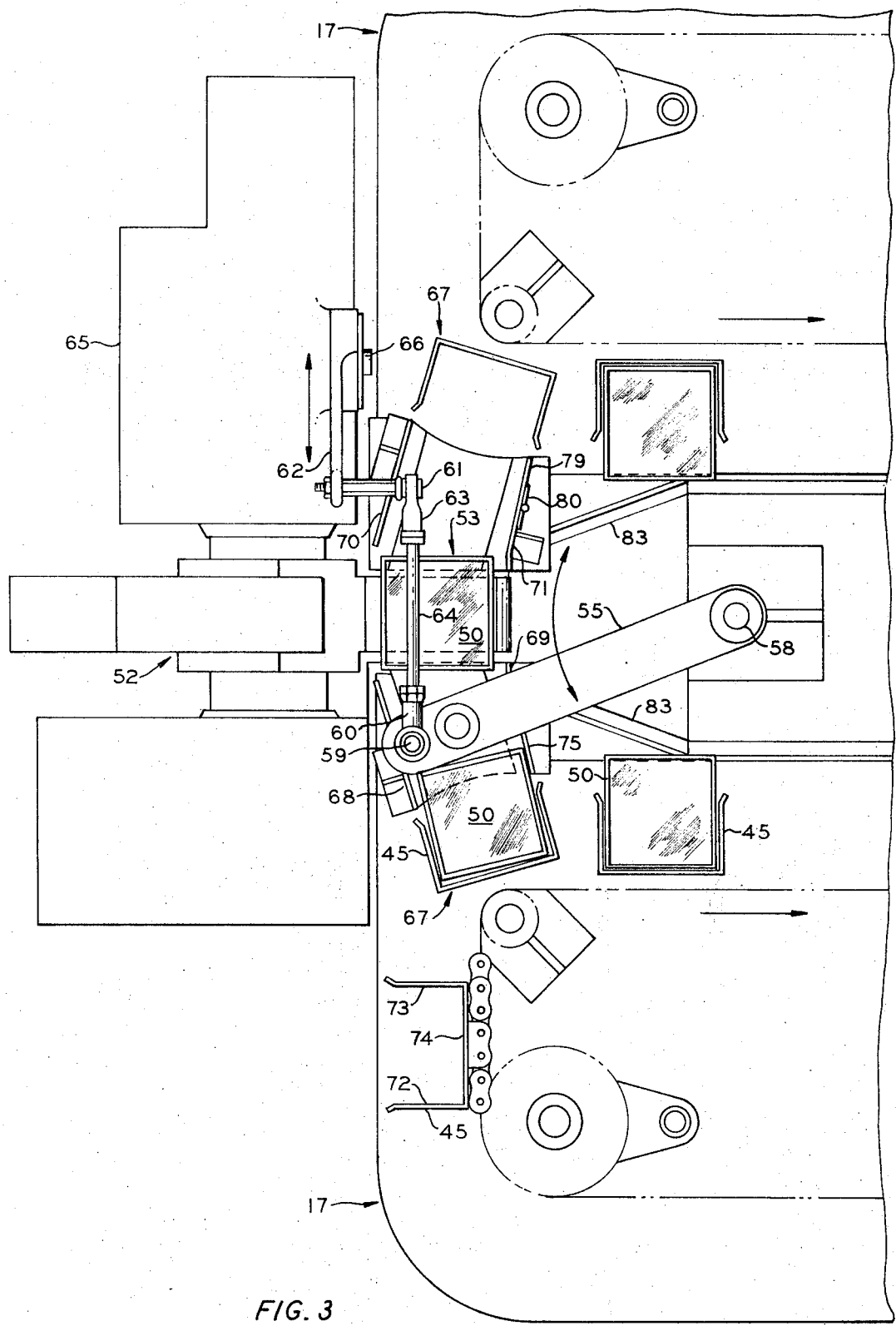
FIG. 3 is a simplified partial plan view of the mechanism for transferring cartons from the forming machine section alternately to the two endless conveyors showing a carton being inserted into a conveyor bucket on one of the conveyors.
Figure 4:
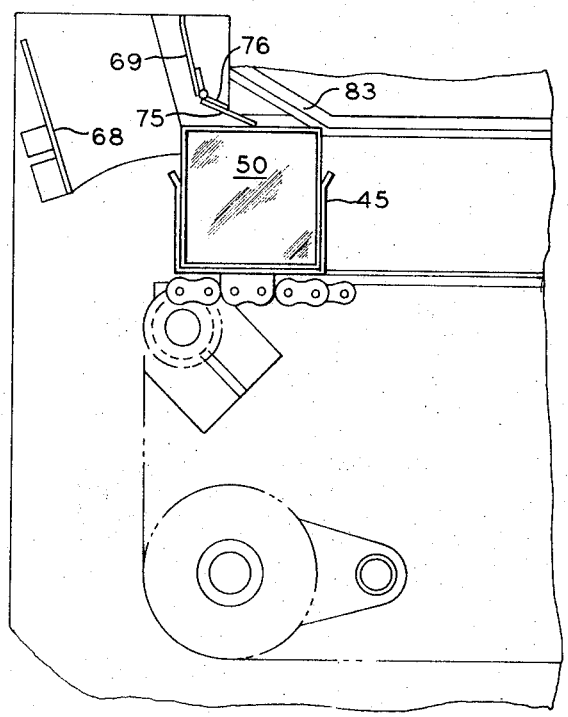
FIG. 4 is a fragmentary view showing the transferred carton being firmly seated in the conveyor bucket.
Figure 6:
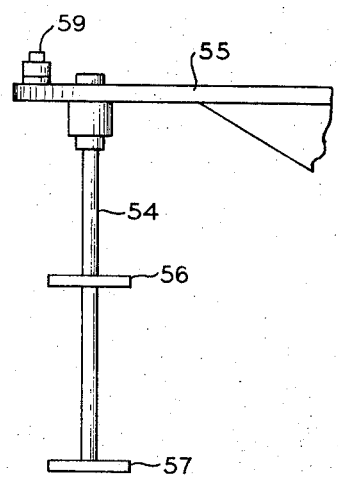
FIG. 6 is a fragmentary elevational view of the pusher rod assembly.
Figure 5:
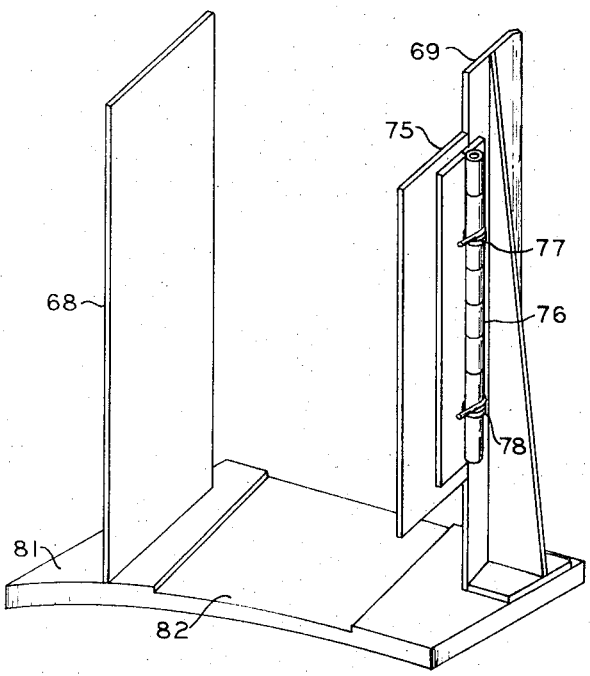
FIG. 5 is a perspective view of the mechanism for seating the transferred carton in the conveyor bucket.

Referring now to FIGS. 2–5, the transfer turret 52, which is illustrated in detail in U.S. Pat. No. 2,726,583, issued Dec. 13, 1955, the description of which is incorporated herein by reference, receives the carton 50 in a horizontal position as the carton is removed from the mandrel 36 in the stripping station 40. The transfer turret 52 is then rotated ninety degrees about a horizontal axis to move the carton to an upright position in the feeding station 53. A pusher arm 54 extends vertically downwardly from the transfer arm or bar 55 and is provided with horizontally extending plates 56 and 57 to contact a side of carton 50 near the top and bottom thereof, respectively. Bar 55 is pivoted on pin 58 which is mounted on the frame of the filling and sealing section 12 for movement in a horizontal plane about pin 58. A ball 59 is mounted adjacent the free end of bar 55 and is engaged by female ball joint socket 60. Ball 59 can be mounted between arm 54 and pin 58, if desired, instead of arm 54 being between ball 59 and pin 58. A ball 61 is mounted on one end of actuating lever 62 and is engaged by female ball joint socket 63. A rod 64 connects socket 60 to socket 63. Actuating lever 62 is oscillated by power means 65 in a vertical plane about shaft 66. The oscillation of lever 62 causes rod 64 to reciprocate in a generally horizontal plane. The motion of rod 64 is nonlinear as bar 55 oscillates about pivot pin 58. The ball joints 59, 60 and 61, 63 permit the horizontal and vertical rotation of bar 64 about balls 59 and 61 necessary to accommodate the motions of lever 62 and bar 55. In FIG. 3, the carton moving mechanism is shown close to one extreme position with a carton 50 inserted into a conveyor pocket or holder 45 at the transfer station 67 of the lower conveyor. The carton 50 is illustrated in the pocket 45 in the transfer station 67 as being slightly askew. This represents an undesirable positioning which is readily corrected by the mechanism of the present invention. Further movement of lever 62 will move rod 64 upwardly, as shown in FIG. 3, to cause pusher arm 54 to travel from the transfer station 67 of the lower conveyor through feed station 53 to contact a new carton 50 and move the new carton 50 into the transfer station 67 of the upper conveyor.

A first pair of guide walls 68 and 69 are positioned between feed station 53 and the transfer station 67 of the lower conveyor 17, while a second pair of guide walls 70 and 71 are positioned between feed station 53 and the transfer station 67 of the upper conveyor 17. Guide walls 68, 69, 70 and 71 can be in the form of vertically mounted plates. Each pair of guide walls are generally parallel to each other and are spaced apart to permit a carton 50 to be moved therebetween. The guide walls can have a converging configuration adjacent the feed station 53 to insure the ease of entry of the carton 50 into the space between the guide walls. At least the major portion of each pair of the guide walls will be parallel to each other and spaced apart a distance only slightly greater than the width of carton 50 to control the alignment of the carton with the conveyor pocket 45 in the respective transfer station 67. Each pocket 45 has first and second vertical side walls 72 and 73 connected by a vertical back wall 74 in a U configuration.

The side walls 72 and 73 of each pocket 45 are at least generally parallel to each other and perpendicular to back wall 74, and are spaced apart a distance only slightly larger than the width of carton 50.

To insure the proper positioning of carton 50 in a conveyor pocket 45, a positioning element 75 is pivotably mounted on the edge of downstream guide wall 69 which is adjacent to the lower conveyor 17, by means of hinge 76. As used herein and in the claims the term upstream and downstream are referenced to the direction of travel of the adjacent portion of the conveyor 17. Springs 77 and 78 are associated with hinge 76 to resiliently bias element 75 to a stable position which is at least substantially coplanar with plate 69. Positioning element 75 extends toward the lower conveyor 17 so that it remains in contact with the carton 50 after pusher arm 54 has inserted the carton into the pocket 45 at the transfer station 67. Upon the actuation of conveyor 17 by ratchet drive 51, the pocket 45 containing the inserted carton 50 moves out of the transfer station by going through the position illustrated in FIG. 4. The positioning element 75 is resiliently biased against carton 50 by springs 77 and 78 to firmly seat the carton 50 in the pocket 45. After the pocket 45 and its associated carton 50 move out of the transfer station 67, the carton 50 is maintained in the pocket 45 by guide 83 and the positioning element 75 clears the carton 50 and returns to its stable position to aid in guiding the next carton into the conveyor pocket 45 moving into transfer station 67. Downstream guide plate 71 for the upper conveyor is provided with a positioning element 79 which is pivotably mounted on plate 71 by hinge 80. Hinge 80 is provided with springs, not shown, corresponding to springs 77 and 78. Positioning element 79 cooperates with the upper conveyor in the same manner as element 75 does with the lower conveyor. Base plate 81, upon which plates 68 and 69 are mounted, can be provided with a central recessed portion 82 to minimize the contact between the base of carton 50 and base plate 81.

Reasonable variations and modifications are possible within the scope of the foregoing disclosure, the drawings and the appended claims to the invention.

That which is claimed is:

1. Apparatus comprising a conveyor having a plurality of article holders, each article holder having first and second side walls connected by a back wall to form a generally U shaped pocket, said conveyor having a transfer station, an upstream guide wall means and a downstream guide wall means positioned adjacent said transfer station to guide an article into the article holder in said transfer station, means for moving an article between said upstream guide wall means and said downstream guide wall means into said article holder in said transfer station, a positioning element pivotably mounted adjacent the edge of said downstream guide wall means closest to said conveyor whereby the article inserted into the article holder in said transfer station is in contact with said positioning element as said conveyor commences to move said article and its associated article holder from said transfer station, and means for resiliently biasing said positioning element to force the article into the desired position in the article holder and to maintain the desired position and then to permit the article and holder to be moved out of said transfer station by the conveyor.

2. Apparatus in accordance with claim 1 wherein said conveyor moves in an at least generally horizontal plane, said first and second side walls and said back wall extend at least generally vertically, and each of said guide wall means is a generally vertically extending plate.

3. Apparatus in accordance with claim 2 wherein said downstream guide wall means is parallel to said upstream guide wall means.

4. Apparatus in accordance with claim 3 wherein said positioning element is a plate hinged to said downstream guide wall means.

5. Apparatus in accordance with claim 4 wherein said means for resiliently biasing said positioning element comprises at least one spring.

6. Apparatus in accordance with claim 5 further comprising means for intermittently actuating said conveyor.

7. Apparatus in accordance with claim 6 wherein said means for moving an article comprises a pusher arm, means for supplying an article to a feed station adjacent the ends of said upstream and downstream guide wall means remote from said conveyor, and means for moving said pusher arm into contact with an article at said feed station and then between said upstream and downstream guide wall means.

8. Apparatus in accordance with claim 7 further comprising a second conveyor having a transfer station and a plurality of said article holders, a second pair of upstream and downstream guide wall means positioned between said feed station and said transfer station of said second conveyor to guide an article from said feed station into an article holder at the transfer station of said second conveyor, a second positioning element pivotably mounted on the edge of the downstream guide wall means of said second pair to be in contact with the article in the article holder on said second conveyor as the article holder is moved from the transfer station of said second conveyor to maintain a desired position of the article in the holder, and wherein said means for moving said pusher arm comprises means for reciprocably moving said pusher arm from the transfer station of one conveyor through said feed station to the transfer station of the other conveyor.

9. Apparatus in accordance with claim 1 wherein said positioning element is a plate hinged to said downstream guide wall means.

10. Apparatus in accordance with claim 9 wherein said means for resiliently biasing said positioning element comprises at least one spring.

* * * * *